United States Patent [19]
Minato et al.

[11] Patent Number: 4,559,073
[45] Date of Patent: Dec. 17, 1985

[54] COMPOSTING EXCRETIONS FROM DOMESTIC ANIMALS

[75] Inventors: Hideo Minato, Suginami; Tadashi Fujisaki, Yono; Kazufusa Shimizu, Setagaya; Yoshiharu Koyanagi, Yokohama, all of Japan

[73] Assignee: Niigata Engineering Co., Ltd., Tokyo, Japan

[21] Appl. No.: 592,339

[22] Filed: Mar. 21, 1984

[30] Foreign Application Priority Data

Aug. 31, 1983 [JP] Japan ................... 58-159956

[51] Int. Cl.⁴ .................... C05F 3/00; C05F 11/02
[52] U.S. Cl. ............................ 71/9; 71/15; 71/21; 71/24; 71/904
[58] Field of Search ............ 71/9, 15, 904, 21, 22, 71/24; 210/611; 119/1

[56] References Cited

U.S. PATENT DOCUMENTS 3,836,676  9/1974  Komakine ................. 71/904 X

FOREIGN PATENT DOCUMENTS 3030982  3/1978  Japan ........................ 71/904

OTHER PUBLICATIONS

Hideo Minato, "Gakushin Kyoryoku Kaiho", No. 39, pp. 2-6, Mar. 25, 1983 (in Japanese). Translation of Pertinent Portions Enclosed.

Primary Examiner—Ferris H. Lander
Attorney, Agent, or Firm—Wenderoth, Lind & Ponack

[57] ABSTRACT

A new method for preparation of organic compost by incorporating zeolite into excretions from domestic animals. In the method, zeolite of about 10 to 30% relative to the total weight of excretions is homogeneously mixed and then piled for a predetermined period so that the water content of a surface portion of the pile of the mixture decreases to about 25% by weight or less, and the average water content of the entire pile decreases to about 55% by weight or less. The piled mixture is then supplied to a fermentation vessel in which it is scooped and turned over such that a high water content portion inside the low water content surface portion is divided into small masses and the low water content surface portion is divided into fine powders, so that the fine powders are spread around the small masses to thereby achieve effective aerobic fermentation in the vessel.

12 Claims, 1 Drawing Figure

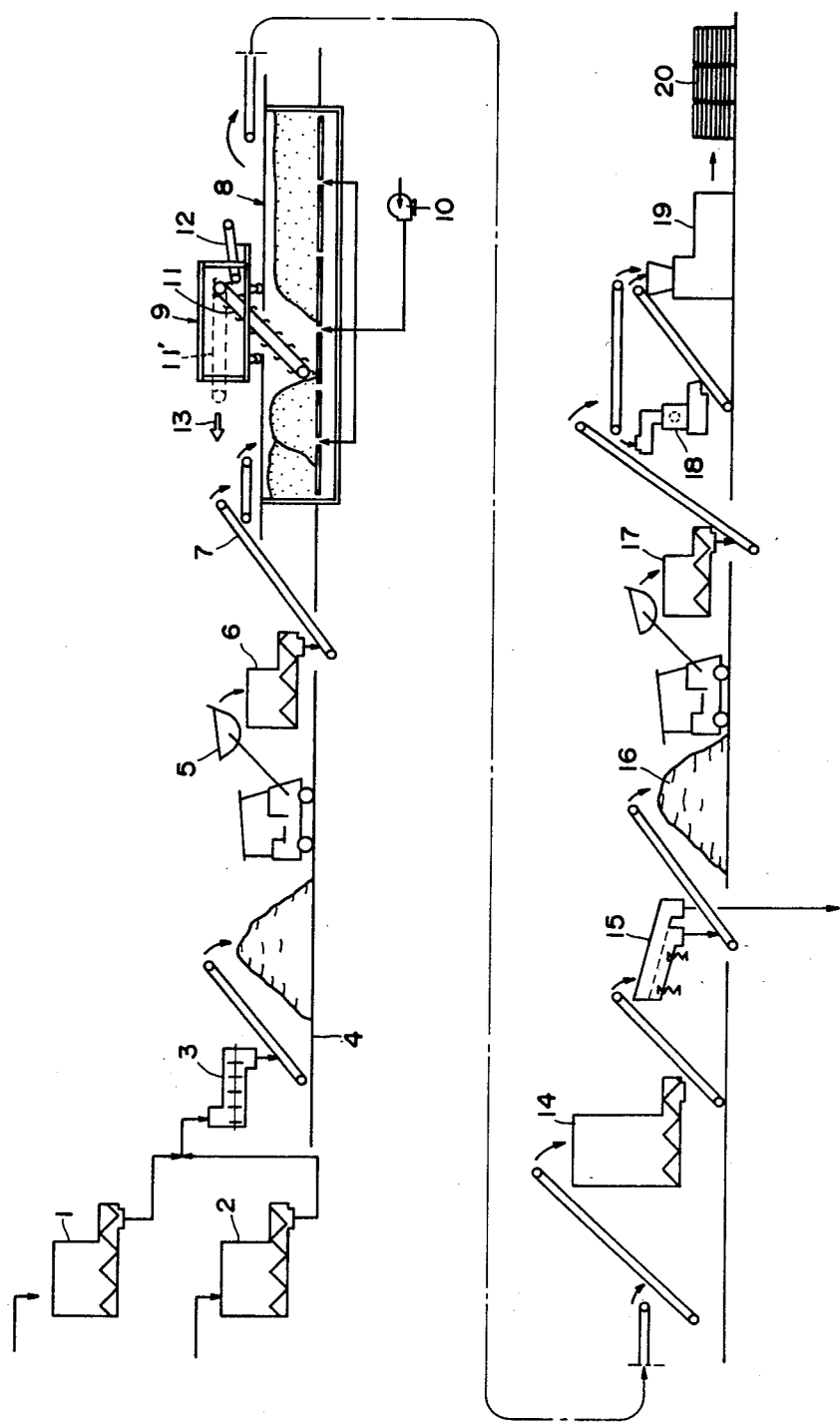

COMPOSTING EXCRETIONS FROM DOMESTIC ANIMALS

BACKGROUND OF THE INVENTION

The present invention relates to a method for the preparation of excellent organic compost by achieving an aerobic fermentation of excretions from domestic animals.

A variety of methods have been proposed to compost feces of fowls or pigs or other excretions from domestic animals. For example, it is generally known to achieve an aerobic fermentation of excretions from domestic animals, in which sawdust, rice hulls, or wood chips have been incorporated as an agent for adjusting the water content of the mixture to be suitable for aerobic fermentation (65% by weight or less). However, as these water content-adjusting agents are organic materials which have difficulty in decomposition, it takes a long time to achieve the complete fermentation, and hence a large fermentation vessel is necessary. Moreover, the resultant compost product has a small bulk specific gravity, which leads to a disadvantage that the product when applied on the field is likely to be driven away by wind or rain.

Another method of achieving an aerobic fermentation of excretions from domestic animals has been proposed, in which zeolite is incorporated to control the water content. The incorporation of zeolite increases fertilizing and soil-conditioning effects of the product because of the water-retentive and base-exchanging actions of zeolite. It is also expected that offensive odors are prevented by the deodorizing action of zeolite. Moreover, a compost product in which zeolite is incorporated has a large bulk specific gravity, which prevents flowing of the product by wind or rain when applied on the field. However, a considerably large amount of zeolite must be incorporated in excretions from domestic animals for these purposes because the water content suitable for aerobic fermentation of the excretion/zeolite mixture is as low as 50% by weight or less, preferably 40% by weight or less. For example, in order to adjust the water content of fowl feces containing 72% by weight water to 50% by weight, zeolite must be incorporated in an amount of about 55% by weight of the fowl feces. The incorporation of such a large amount of zeolite relatively decreases the content of organic materials in the mixture, which inhibits desirable aerobic fermentation.

SUMMARY OF THE INVENTION

An object of the present invention is to provide a method for the preparation of excellent organic compost rich in organic materials by incorporating zeolite having the above-mentioned desirable characteristics into excretions from domestic animals, and achieving an effective aerobic fermentation of the mixture.

Another object of the present invention is to provide a method for preparation of organic compost, which needs relatively a short period of time for fermentation.

A further object of the present invention is to provide a novel method for preparation of organic compost in which the organic compost has a large bulk specific gravity.

The method of composting excretions from domestic animals according to the present invention comprises the steps of piling and accumulating excretions from domestic animals, in which about 10 to 30% of zeolite (based on the total weight of the excretions) has been incorporated and homogeneously mixed, and subjecting the excretion/zeolite mixture to piling until the water content on or around the surface of the piled mixture becomes about 25% by weight or less, while the average water content of the entire pile becomes about 55% by weight or less. Further the method of the present invention has a step of composting the thus piled mixture by achieving an aerobic fermentation of the mixture in a fermentation vessel which is provided with a turn-over device for scooping and turning over the mixture accumulated in the fermentation vessel.

The term "water content" used in the present specification is expressed on wet basis.

DETAILED DESCRIPTION OF THE INVENTION

In the method of the present invention, a mixture of excretions from domestic animals and zeolite is piled for a predetermined period outside a fermentation vessel without being directly subjected to aerobic fermentation in the fermentation vessel. It is not necessary, therefore, to incorporate zeolite in the first stage in such an amount that makes the water content suitable for aerobic fermentation. The mixture can attain the water content suitable for aerobic fermentation while it is dried during the piling period. In the present invention, zeolite is incorporated in the starting material, i.e. excretions from domestic animals, in the first stage in a comparatively small amount ranging from about 10 to 30% by weight based on the weight of the excretions. The obtained mixture does not necessarily have a water content suitable for aerobic fermentation, but a water content that enables the mixture to be piled will suffice. If zeolite is incorporated in 10% by weight or less, the water content-adjusting action of zeolite, as well as other effects of it, cannot be achieved. On the other hand, if zeolite is incorporated in 30% by weight or more, the content of the organic materials in the mixture is decreased so that it is difficult to obtain compost products abundant in organic materials.

The thus prepared mixture of excretions from domestic animals and zeolite is usually clayish and sticky. During the piling, the mixture is gradually dried, and at the same time the organic materials in the mixture are slowly decomposed with a mild growth of aeorbic fermentation bacteria. The piling step usually proceeds outdoors in the airy place shielded from rain. As the deodorizing action of zeolite prevents generation of offensive odors or development of worms and files during the piling period, the mixture is piled under sanitary conditions.

The piling step of the mixture produces a well dried portion on or around the surface of the pile having a low water content and an inside portion having a relatively high water content. In other words, as the pile of the mixture is not turned over during the piling period as a general rule, the pile is well dried on or around the surface and less dried inside. The piling is continued until the water content on or around the surface of the pile is about 25% by weight or less, and the average water content of the entire pile is about 55% by weight or less. In this respect, the average water content is calculated based upon the assumption that the pile is mixed homogeneously although it is not actually mixed homogeneously. It is not desirable to reduce the average water content of the entire pile to 35% by weight or less because excessive drying prevents aerobic fermentation in the fermentation vessel, though it is usually difficult to decrease the average water content of the pile to 35% by weight or less by piling alone. It is generally preferred to keep the average water content of the entire pile within the range of from about 38 to 45% by weight. As will be explained presently, it is necessary in this piling step to allow the pile to have a low water content portion on or around the surface and a relatively high water content inside portion without forming a homogeneous mixture of the pile.

The above-described piling step is usually completed in about 10 to 30 days. The mixture will have been dried by then to have a predetermined water content. It is necessary in the last stage of the piling step that the pile of the mixture has a surface portion having a low water content and an inside portion having a high water content. The pile may be optionally turned over with a scoop or a shovel and so on in the first stage of the piling to shorten the piling period.

In the piling step, it is usually preferred to have a yard for accumulation outside the fermentation vessel. As the mixture of excretions from domestic animals and zeolite has a bulk specific gravity of as high as 0.9 to 1, the volume of the pile is not so large, and therefore a relatively small accumulation yard will suffice.

Zeolite to be used in the present invention is a hydrated aluminosilicate containing alkali or alkaline earth metals. The principal chemical composition of zeolite comprises $SiO_2$, $Al_2O_3$, $H_2O$, $CaO$, $Na_2O$, $K_2O$, and a small amount of $MgO$, which are a series of natural minerals having dehydratable and vitrifiable properties when heated at a relatively low temperature of around 500° C. They are foamed by this dehydration and vitrification. It is preferred in the present invention to use zeolite which has been subjected to the heat dehydration, but those which are not heat-treated may also be used.

Among a variety of zeolites, clinoptilolite ($Ca$, $Na_2$, $K_2$) $[Al_2Si_7O_{18}]$. $6H_2O$ or tuff principally consisting of clinoptilolite shows remarkable effects in the present invention. They occur in Futatsui district in Akita Pref. and in Itaya district in Yamagata Pref, Japan.

Zeolites of various particle sizes can be selectively used according to the applications, from powdery ones of about 150 mesh-pass to granular ones having a particle diameter around 3 mm. As will be described below, when the obtained compost is to be directly pelletized, powdery zeolite of 10 mesh or smaller is used.

The piled mixture of the excretions from domestic animals and zeolite is then charged into a fermentation vessel provided with a turn-over device to achieve an aerobic fermantation. As described above, there coexist in the piled mixture a dried portion on or around the surface having a low water content, and an inside portion having a high water content. When such piled mixture is subjected to aerobic fermentation while being turned over in the fermentation vessel, it is important that the aforementioned two portions, that is, a low water content surface portion and high water content inside portion, still coexist in the vessel, without being mixed homogeneously, in the early stage of fermentation. The turn-over device of the fermentation vessel, therefore, must not be a stirring device with a screw but a scooping one in which the mixture accumulated in the vessel is scooped and turned over without mixing the mixture homogeneously. If the screw-type device is used, the low water content portion and the high water content portion of the excretion/zeolite mixture, which have been produced in the piling step, are homogeneously kneaded to produce a clayish mixture, which cannot achieve an effective aerobic fermentation. On the other hand, the aerobic fermentation is well achieved by the scooping device which can scoop and turn over the excretion/zeolite mixture without mixing it homogeneously because when the mixture is simply scooped up and then allowed to fall into the fermentation vessel, the high water content portion of the mixture is divided into small masses, while the dried low water content portion is divided into fine powders, which are spread around the masses produced from the high water content portion and preventing these masses from being bound each other, thus assuring good air flow through the masses.

As the aerobic fermentation proceeds in the fermentation vessel, the masses having a high water content are gradually dried. In the later stage of the fermentation, therefore, these masses are finely divided, and finally converted into a wholly pulverized, completely fermented compost.

The aerobic fermentation can be promptly started in the fermentation vessel because the aerobic fermentation bacteria have been allowed to grow to some extent in the piling step and zeolite is involved therein. Thus the fermentation period can be shortened, usually, to about 7 to 15 days and a relatively small fermantation vessel can be used satisfactorily. An open-type, horizontal fermentation vessel can be used because generation of offensive odors is prevented by the deodorizing action of zeolite. However, it is preferred to use a fermentation vessel of the type having a perforated inner bottom through which air can be supplied into the vessel so that aerobic fermentation is accelerated by supplied air.

In conveying the piled mixture into the fermentation vessel, it is preferable to use a belt conveyor instead of a screw conveyor to minimize homogenous intermixture of the low water content surface portion and the high water content inside portion, which have been produced during the piling step.

The compost produced by the aerobic fermentation in the fermentation vessel is a brown, wholly pulverized, completely fermented compost containing about 25% by weight water. As the amount of the initially incorporated zeolite is adjusted not to exceed 30% by weight, the compost is abundant in organic materials. The compost product applied on the field is prevented from being flown away with wind or rain because the bulk specific gravity of the product has been increased by the incorporation of zeolite (to about 0.7–0.8). It is expected that the compost product has excellent properties, including water-retentive, base-exchanging and other effects caused by the incorporation of zeolite.

The thus produced pulverized compost may be pelletized, if necessary. As the water content of the pulverized compost product is relatively low, it can be directly pelletized by supplying it to a pelletizer without further drying or incorporation of other additives. A disc pelletizer can be preferably employed as the pelletizer.

In the piling step of the present invention, it is sufficient to incorporate zeolite alone in the starting material of fermentation, i.e. excretions from domestic animals. If part of the fully fermented compost product obtained by the present invention is incorporated in the excretion/zeolite mixture during the piling step, the growth of aerobic bacteria is accelerated to advantageously facilitate the next aerobic fermentation step in the fermentation vessel.

Peat moss may be incorporated optionally after the piling treatment in the excretion/zeolite mixture to improve the physical properties of the piled mixture. Peat moss, known as a soil-conditioning substance abundant in organic materials, is produced by the humification and carbonization of sphagnum which has been accumulated for thousands of years. When peat moss is incorporated into the excretion/zeolite mixture, the piled mixture in the fermentation vessel is endowed with good air permeability, that is, preferable conditions for aerobic fermentation. The incorporation of peat moss also increases the abundance of organic materials in the obtained compost product without prolonging fermentation period in the fermentation vessel. Moreover, the obtained compost is more easily pelletized by the incorporation of peat moss because the load of the pelletizer is reduced.

BRIEF DESCRIPTION OF THE DRAWING

The drawing is a diagrammatic illustration, which shows a method for preparation of organic compost according to a preferred embodiment of the invention.

PREFERRED EMBODIMENT OF THE INVENTION

The preferable embodiment of the present invention will now be described with reference to the diagrams shown in the drawing. The starting material i.e. excretions from domestic animals, for example, fowl feces, and zeolite are stored respectively in a fowl feces hopper 1 and in a zeolite hopper 2, from which they are discharged in an amount of 0.1 to 0.3 part by weight of zeolite based on 1 part by weight of the fowl feces. The discharged feces and zeolite are homogeneously mixed in a mixer 3, and the mixture is piled and accumulated in an accumulation yard 4 and dried until the water content reaches the predetermined value.

The piled mixture is then charged into a corner of a fermentation vessel 8 through a shovel loader 5, a fixed-amount discharger 6, and a belt conveyor 7, but the mixture may be directly charged into the fermentation vessel 8 through the shovel loader 5.

The mixture charged into the fermentation vessel 8 is transported from one corner of the vessel to the other corner while it is turned over once or twice a day by a scooping turn-over device 9 which is running over the fermentation vessel. Aerobic fermentation is achieved simultaneously in the presence of the air supplied from the bottom through a blower 10. The turn-over device 9 is provided with an inclined turn-over elevator 11 and a belt conveyor 12 adjacent thereto. The mixture accumulated in the fermentation vessel is drawn up by the elevator 11 to a position above the level of the mixture in the vessel and then fallen down onto the belt conveyor 12, and further down into the fermentation vessel in the rear of the moving direction (arrow 13) of the turn-over device.

More particularly, the mixture is turned over by the scooping turn-over device 9 as follows: the turnover device 9 stops at the right corner of the fermentation vessel 8 at the beginning, with the turn-over elevator 11 being located in position 11', wherein the lower end of the elvator 11 is raised. The elevator is rotated and moved down such that the lower end thereof, which was lifted up to the level position as illustrated by phantom lines 11', is lowered again to the inclined position as illustrated by solid lines 11, and driven to move toward the left corner of the fermentation vessel 8. As the elevator runs, the mixture in the vessel is drawn up and passed on to the rear of the running direction. When the running wheels of the turn-over device 9 reach the left corner of the fermentation vessel to complete one stroke of the turn-over operation, the elevator 11 is again raised in position 11', at the left corner, and the turn-over device 9 is returned to the right corner of the fermentation vessel 8 in that state. An additional mixture is charged through the belt conveyor 7 into the vacant space in the left corner of the fermentation vessel 8. When the mixture is to be turned over once a day, the above-described operation is proceeded once a day, and when it is necessary to turn over the mixture twice a day, the operation is repeated.

An example of the size of the fermentation vessel and the amount of the treatment will be described. In a fermentation vessel of 3 m in width, 80 m in length, and 1.1 m in the height of accumulation in the vessel, the mixture is transported by 4 m by one turn-over operation (drawing up and falling down). If the turn-over operation is carried out twice a day, the mixture moves by 8 m per day in the vessel. Then, it takes ten days for the mixture to reach the right corner of the fermentation vessel to be taken out of it. The amount of the treated mixture is about 26 m$^3$ ($\approx 3 \times 8 \times 1.1$).

The fermented mixture is taken out of the fermentation vessel 8 and fed by a belt conveyor through a fixed-amount discharger 14 to a vibrating sieve 15, where it is sieved to yield a pulverized, fully fermented compost product 16 having a particle diameter of about 5 to 0.1 mm. The oversized larger grains are finely divided to be mixed with the product, or returned to the fowl feces hopper 1 to be mixed with the starting material.

The compost product 16 is optionally charged into a pelletizer 18 through a fixed-amount discharger 17 to be pelletized, and shipped as bagged pellet product 20 through a metering type bagging machine 19.

The effects of the present invention will be more readily understood by the following example and comparative examples, in which symbol % represents percent by weight.

EXAMPLE

In 1000 kg of fowl feces (water content of 72%), 300 kg (about 30% based on the weight of the fowl feces) of powdery zeolite (10 mesh-pass, water content of 7.5%) was incorporated and homogeneously mixed to obtain a clayish fowl feces/zeolite mixture having a water content of 57%. After piling the mixture for 15 days in an accumulation yard, 900 kg of a semi-dried mixture was obtained. The water content on or around the surface of the pile was 20% and the average water content of the entire pile was 38%.

The piled mixture was then charged, as an amount treated in one day, into an open-type fermentation vessel (1.0 m in width $\times$ 1.3 m in height $\times$ 14 m in length) provided with a scooping turn-over device illustrated by reference numeral 9 in the attached drawing, and the entire mixture in the vessel was turned over once a day with air supplied from the bottom of the fermentation vessel. After the aerobic fermentation for 10 days in the fermentation vessel, the temperature of the fermented mixture reached 50° to 70° C., and about 640 kg of pulverized brown compost (water content of 25%, bulk specific gravity of 0.8) was obtained.

The thus obtained compost product was directly pelletized by a disc pelletizer without drying or incorporation of other additives, to obtain pellet products of 3 mm in particle diameter and 10 mm in length. Substantially no offensive odors nor worms and flies were generated during the piling period. The amount of the generated $NH_3$ gas during the fermentation was as small as 300 ppm at maximum.

COMPARATIVE EXAMPLES

Ex. 1: The fowl feces/zeolite mixture obtained in the above example was piled for 30 days and further piled continuously for additional 10 days in the accumulation yard. The portion around the surface of the piled mixture was a dry, hard solid with a water content of 20% or less, while the inside portion was sticky and achieved little aerobic fermentation. Neither of the portions were composted.

Ex. 2: After the fowl feces/zeolite mixture of the above Example was piled for 30 days in the accumulation yard, the piled mixture was turned over with a shovel loader and further piled for additional 10 days. Although the mixture achieved a little aerobic fermentation during this additional piling period, the mixture could not be divided into small masses through the turn-over step by means of the shovel loader alone. The obtained products were only larger masses, the inside of which was sticky and not composted.

Ex. 3: The fowl feces/zeolite mixture of the above Example was directly charged into the fermentation vessel without a piling treatment in the accumulation yard. The thus treated mixture was clayish and sticky, and achieved no aerobic fermentation.

Ex. 4: 1000 kg of fowl feces (water content of 72%) was piled for 15 days in the accumulation yard without incorpration of zeolite, and 640 kg of the semi-dried fowl feces (average water content of 56%) was obtained. When this semi-dried mixture was subjected to an aerobic fermentation for 10 days in the fermentation vessel in the same manner as described in the above Example, about 320 kg of granular brown-black compost was obtained. However, the obtained compost product contained water of as high as 40%, and some of the grains were not fermented inside. The product had a bulk specific gravity of 0.6, and was likely to be flown away with wind or rain when applied on the field. Much offensive odor was generated, as well as worms and flies during the piling period. The amount of the $NH_3$ gas generated during the fermentation was 11,000 ppm at maximum.

Ex. 5: 70 kg of sawdust (having the same volume as 300 kg of the zeolite of the above Example) was incorporated in and homogeneously mixed with 1000 kg of fowl feces (water content of 72%) to obtain a fowl feces/sawdust mixture containing 69.4% of water. The mixture was piled for 15 days in the accumulation yard to afford 680 kg of a semi-dried mixture (average water content of 52%). The piled mixture was then subjected to an aerobic fermentation in the fermentation vessel in the same manner as described in the above Example, yielding about 408 kg of compost. The obtained compost, however, contained water of as high as 40%, with incompletely fermented sawdust remaining in the product. The bulk specific gravity of the product was 0.5. The amount of the $NH_3$ gas generated during the fermentation was 600 ppm at maximum.

As understood from the above description, in the process of the present invention, the excretions from domestic animals can be composted by effective fermentation by the incorporation of a relatively small amount, that is, about 10 to 30% by weight zeolite. The obtained compost product, having a low water content and abundant organic materials, is an excellent organic compost difficulty driven away with wind or rain when applied on the field. Moreover, the product can be directly pelletized.

The incorporation of zeolite can not only prevent generation of offensive odors or development of worms and flies during the piling and fermentation steps, but also accelerates drying in the piling step and aeroic fermentation in the fermentation step.

The piling treatment outside the fermentation vessel is advantageous for the drying of the excretion/zeolite mixture as well as for the growth of the aerobic fermentation bacteria and gradual decomposition of the organic materials. Therefore, aerobic fermentation in the fermentation vessel is promptly started and completed in a shortened period, so that the fermentation vessel can be diminished in size.

While the invention has been described in its preferred embodiment, it is to be understood that modifications and variations will occur to those skilled in the art without departing from the spirit or scope of the following claims.

What is claimed is:

1. A method of composting excretions from domestic animals, comprising the steps of:
   (1) homogeneously mixing zeolite with excretions from domestic animals, the zeolite being about 10 to 30% by weight relative to a total weight of the excretions; the average water content of the mixture being above 55% by weight;
   (2) piling and accumulating the mixture to naturally dry said mixture to produce a relatively low water content portion on a surface of the piled mixture and a relatively high water content portion inside said low water content portion;
   (3) maintaining the mixture piled until the water content of said low water content portion decreases to about 25% by weight or less, and an average water content of the entire mixture decreases to about 55% by weight or less;
   (4) supplying the piled mixture into a fermentation vessel so as to avoid homogeneous mixing of said low water content portion with said high water content portion;
   (5) scooping and turning over the mixture accumulated in the fermentation vessel such that said high water content mixture is divided into masses and said low water content portion is divided into fine powders so that said fine powders are spread around said masses, thereby preventing said masses from being bound each other; and
   (6) subjecting said mixture in the fermentation vessel to an aerobic fermentation to thereby produce a compost.

2. The method according to claim 1, wherein said zeolite is clinoptilolite.

3. The method according to claim 1, wherein zeolite alone is mixed with the excretions in the mixing step.

4. The method according to claim 1, wherein the mixture is maintained piled for about 10 to 30 days.

5. The method according to claim 1, wherein peat moss is incorporated into the mixture after maintaining the mixture piled.

6. The method according to claim 1, wherein the piled mixture is supplied into said fermentation vessel by means of a belt conveyor.

7. The method according to claim 1, wherein the aerobic fermentation in said fermentation vessel is carried out for about 7 to 15 days.

8. The method according to claim 1, wherein said fermentation vessel is equipped with a turn-over device for scooping and turning over the mixture accumulated in the vessel.

9. The method according to claim 1, wherein air is supplied to said mixture accumulated in the fermentation vessel when the mixture is subjected to aerobic fermentation.

10. The method according to claim 1, wherein said produced compost is further subjected to pelletizing treatment.

11. The method according to claim 1, wherein said scooping and turning over operation is carried out once or twice a day during the aerobic fermentation.

12. The method according to claim 1, wherein the excretions from domestic animals are fowl feces.

* * * * *